United States Patent [19]
Brandt, Jr.

[11] Patent Number: 5,165,290
[45] Date of Patent: Nov. 24, 1992

[54] FORCE TRANSDUCER

[76] Inventor: Robert O. Brandt, Jr., 5404 Pond Dr., Wilmington, N.C. 28403

[21] Appl. No.: 662,428

[22] Filed: Feb. 28, 1991

[51] Int. Cl.⁵ .............................................. G01L 1/22
[52] U.S. Cl. ........................... 73/862.622; 73/862.628
[58] Field of Search .............. 73/862.65, 862.63, 766, 73/861.72, 861.73, 861.74, 24.03, 526, 496, 430, DIG. 10; 177/16, 145

[56] References Cited

U.S. PATENT DOCUMENTS

| | | | |
|---|---|---|---|
| 3,501,951 | 3/1970 | Giles | 73/862.62 |
| 3,914,993 | 10/1975 | Babcock | 73/821 |
| 4,165,975 | 8/1979 | Kwiatkowski et al. | 177/16 X |
| 4,633,721 | 1/1987 | Nishiyama | 73/862.65 X |
| 4,696,358 | 9/1987 | Doerman et al. | 177/145 |

FOREIGN PATENT DOCUMENTS 0142472  6/1980  Fed. Rep. of Germany ... 73/861.73

OTHER PUBLICATIONS

Ort, W. "The Latest In-Foil Strain Gauges Versus Thin Film Strain Gauges" (Sep. 18-22, 1978 6th Int. Conf. on Experimental Stress Ansalysis) pp. 285-289.

Primary Examiner—Michael Razavi
Assistant Examiner—Elizabeth L. Shopbell
Attorney, Agent, or Firm—Rosenthal & Putterman

[57] ABSTRACT

A transducer for converting an applied curvilinear force into an electrical output signal. The transducer includes a load cell that converts the input signal in the form of a curvilinear applied mechanical force into an electrical output signal that is proportional to the applied force. A column has one end that is adapted to receive the mechanical force and a second end that is connected to the load cell and communicates the applied force thereto.

16 Claims, 5 Drawing Sheets

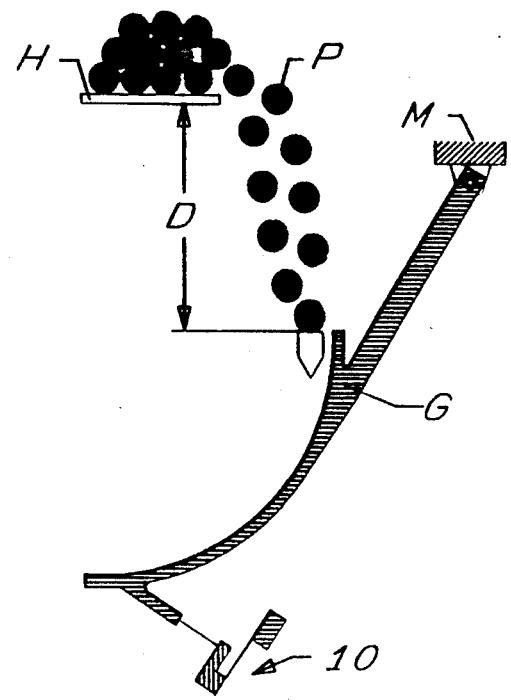
Figure 1
Figure 2
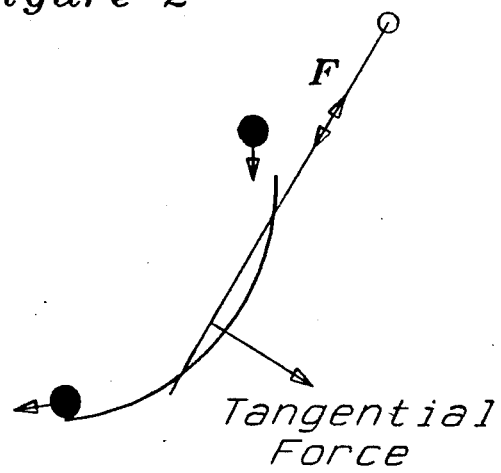

5,165,290

FORCE TRANSDUCER

FIELD OF THE INVENTION

This invention relates generally to the field of force transducers and specifically, to transducers for converting an applied curvilinear force into a proportional linear force to produce an electrical output signal that is proportional to the applied force.

BACKGROUND OF THE INVENTION

Heretofore, force measuring systems have been based on the application of a force, such as an object to be weighed, being dropped or otherwise impacting a surface to which a sensor, such as a weigh beam having a piezoelectric sensor is attached, thus, producing an electrical signal proportional to the applied force. However, I have determined that the overall accuracy of weighing systems can be greatly improved if the material to be weighed is guided along a curvilinear flow path. However, systems of this type have not been implemented due to the lack of suitable transducers for converting an applied curvilinear force into an electrical output signal proportional thereto.

In view of the foregoing, it is an object of the present invention to provide a transducer for converting an applied curvilinear force into an electrical output signal proportional thereto.

Another object of the present invention is to provide a transducer for converting an applied curvilinear force into an electrical output signal proportional thereto that is accurate and reliable.

SUMMARY OF THE INVENTION

To accomplish the foregoing objects, there is provided a transducer for converting an applied curvilinear force into an electrical output signal. The transducer comprises a load cell means for converting an input signal in the form of a curvilinear applied mechanical force into an electrical output signal that is a function of the applied mechanical force and a column means for communicating the applied curvilinear force to the load cell means. The column means includes a first end and a second end the first end of which is adapted to receive the curvilinear force and the second end of which is connected to the load cell means.

BRIEF DESCRIPTION OF THE DRAWINGS

Some of the features and advantages of the invention having been briefly been described, others will appear from the detailed description which follows when taken in connection with the accompanying drawings in which FIG. 1 is a side view of a weighing apparatus including the transducer according to the present invention.

FIG. 2 is a schematic diagram illustrating the forces exerted on the guide means by a particle being dropped and travelling along, the guide means.

DETAILED DESCRIPTION OF THE PREFERRED EMBODIMENTS

Figure 3:
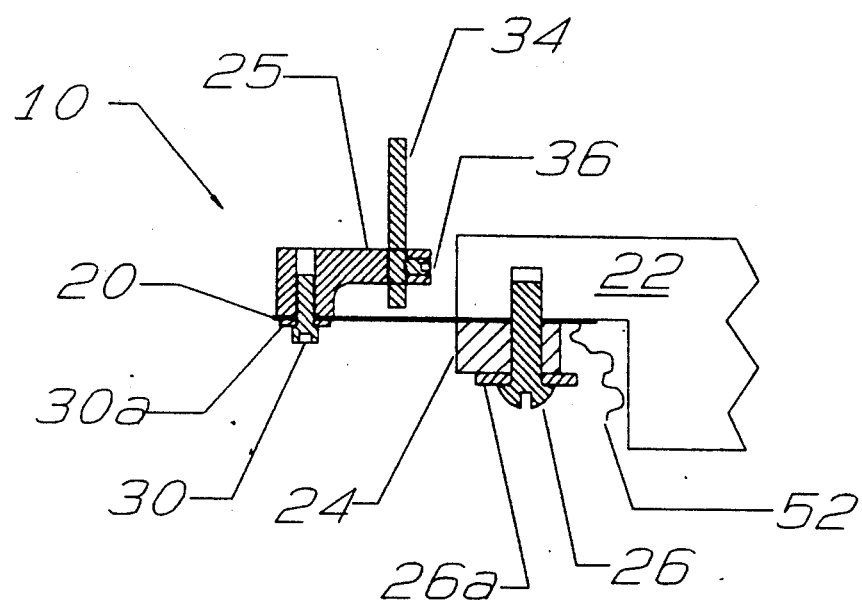
FIG. 3 is a side view of the transducer according to the present invention.

While the present invention will be described more fully hereinafter with reference to the accompanying drawings, in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Referring now to the figure, and particularly to figure 1, a weighing apparatus such as would include the transducer of the present invention, is there illustrated. In that figure, a weighable unit of particles P is stored in a schematically shown dispensing hopper H that is positioned a predetermined distance D above the point of impact of the particles P on a curved elongate guide G.

The elongate guide is provided for guiding the weighable unit along a predetermined path. The guide G includes an entry end and an exit end and is curved along the portion that extends between the entry and exit ends. In addition, a straight arm section extends upwardly from the entry end and pivot point is located at the far end thereof. The pivot point takes the form of a hole defining an opening which is adapted to receive a screw and nut that connects to a mounting block M that supports the guide. It is desirable to minimize the mass of the guide, and it, therefore, is preferably fabricated out of a sturdy lightweight material, such as aluminum, plastic, and the like. Located near the exit end of the guide is a relatively short downwardly extending arm, the function of which will become apparent as the specification proceeds. Those skilled in the art will recognize that the pivot point could be created with a variety of structures such as ball bearings or a flexure mounted within the opening.

An important feature of the guide G resides in the relation between the pivot point and the tangential force component of the weighable unit as it contacts and travels along guide. Specifically, the guide is shaped so that the axis drawn through the guide to the pivot point is at right angles to the tangential force component of the weighable unit a the weighable unit traverses the guide. In this manner, the average friction force component F of particle traversing the guide is equal to and opposite the force exerted on the pivot, thus, cancelling each other and yielding a force component that is purely related to the mass of the weighable unit. This principle is illustrated in the force diagram of FIG. 2.

The transducer or force sensing system of the present invention is generally indicated at 10 and converts the curvilinear force exerted by the weighable unit o the guide G into a electrical signal representative thereof. The transducer 10 includes a load cell means or weigh beam 20 that is secured to a mounting base 22 through a beam mounting block 24. An attaching screw 26 extends through beam mounting block 24 and with the assistance of a washer 26a secures beam mounting block 24 and beam 20 to the mounting base 22 of the measurement system 10.

Secured to the opposite end of weigh beam 20 is a mounting bracket 25. Mounting bracket 25 is secured to weigh beam 20 via screw 30 and associated washer 30a.

A column means or displacement transfer link 34 is provided for communicating the curvilinear force exerted by the particles P on the guide G to the load cell. The column has a first end that is connected to the guide proximate the exit end and the second end of weigh beam 20 is adjustably mounted within bracket 25 by set screw 36. Column 34 extends upwardly over the central portion of the weigh beam 20. A mechanical column, column, or column means as employed herein is a long slender element having a length to diameter ratio between about 20 and about 80 and as used herein the ratio is 42. This arrangement is commonly referred to as an S-loaded weigh beam which yields greater force multiplication as bending of the beam affects two locations and, therefore, exaggerates loading on the sensors as will be more fully described hereinbelow. It will be noted, that the benefits and advantages of the present invention can be achieved with equal efficacy when other beam loading arrangements such as cantilevers are employed.

Figure 4:
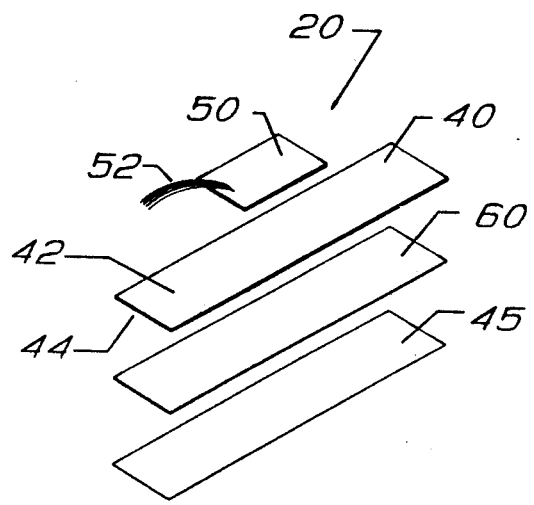
FIG. 4 is an exploded view, taken in perspective, of a first embodiment of the load cell means of the present invention.
Figure 5:
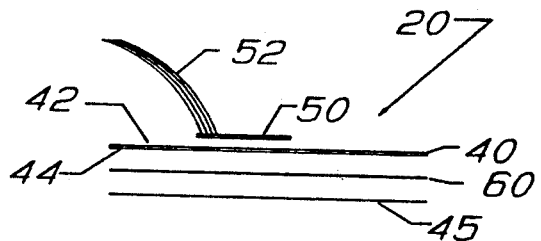
FIG. 5 is an exploded side view of a first embodiment of the load cell means of the present invention.
Figure 6:
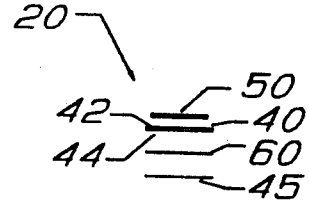
FIG. 6 is an exploded end view of a first embodiment of the load cell means of the present invention.
Figure 10:
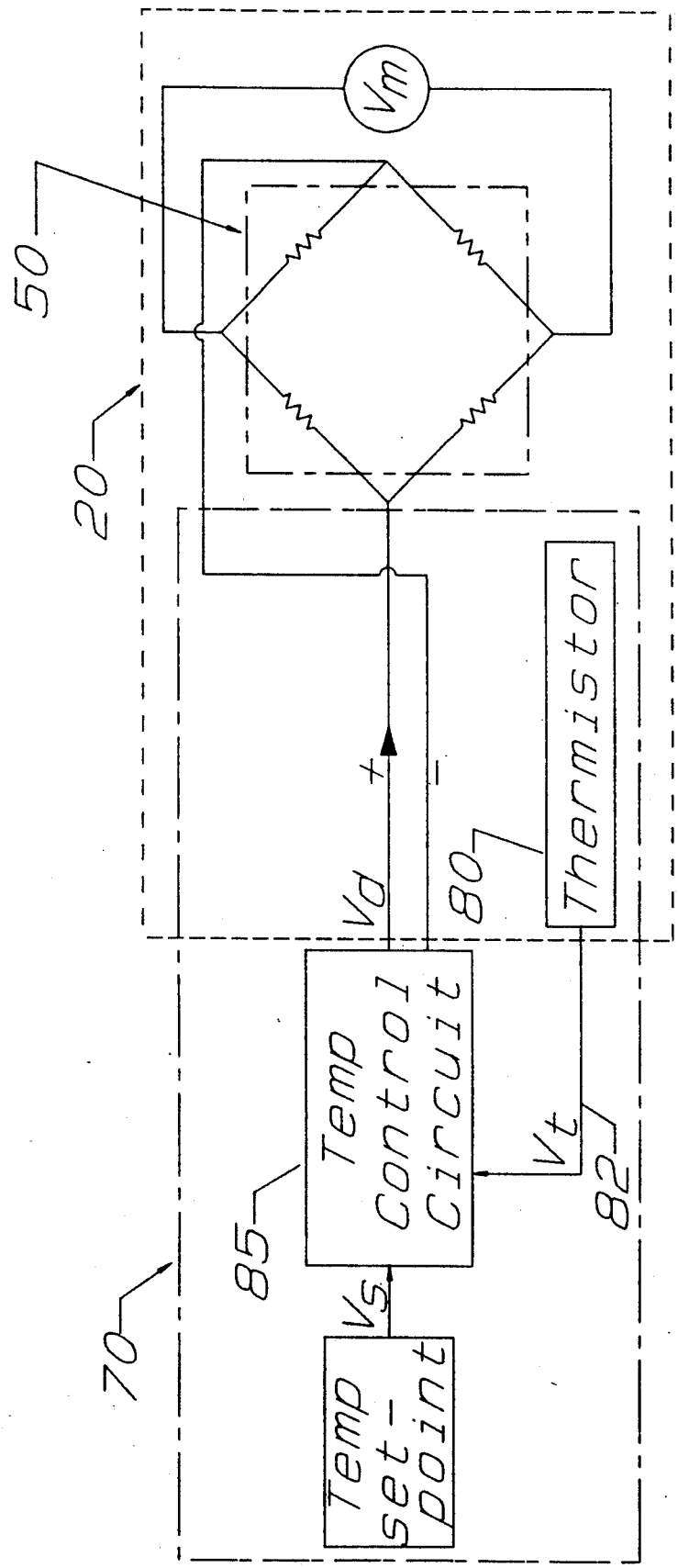
FIG. 10 is a schematic diagram of the load cell means and the temperature control circuit therefore of the present invention.

Turning now to FIGS. 4-6, a first embodiment of the load cell or weigh beam 20 according to the present invention is there illustrated. The load cell 20 is characterized by its ability to accurately measure applied force of short duration (between about three seconds and two milliseconds) and to produce an output signal $V_M$ that is a function of the applied force that is substantially free of resonant vibration (see FIG. 10). The load cell 20 comprises a beam member 40, a strain gauge 50 and a damping means 60.

The beam member 40 comprises an elongate substantially flat substrate having a first surface 42 and a second surface 44.

A strain gauge means or strain gauge 50 is mounted to one of the surfaces (in the illustrated embodiment surface 42). The preferred strain gauge is a semiconductor or metal foil Wheatstone bridge, well known to those skilled in the art. The strain gauge and beam member units are usually purchased preassembled as a off the shelf unit from suppliers such as Omega electronics (see for example, part numbers LCL 454G and LCL 113G). As the Wheatstone bridge generates four output signals, four output wires 52 therefrom are, accordingly, provided. Two leads carry as inputs to the bridge the signal $V_D$ and two leads carry as outputs from the bridge the signal proportional to load cell deformation, $V_M$, as will be more fully explained hereinbelow.

Figure 7:
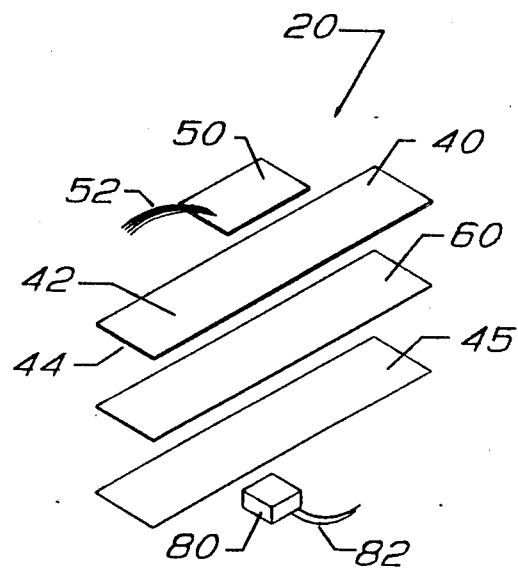
FIG. 7 is an exploded view, taken in perspective, of a second embodiment of the invention, including the temperature control circuit of the present invention.
Figure 8:
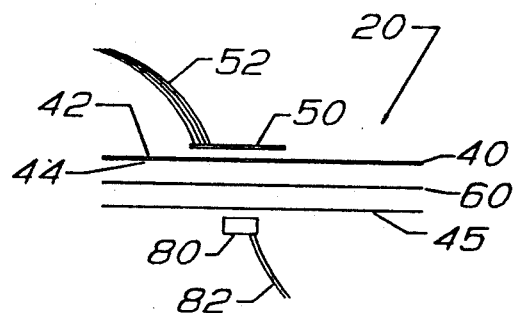
FIG. 8 is an exploded side view of a second embodiment of the load cell means of the invention including temperature control circuit of the invention.
Figure 9:
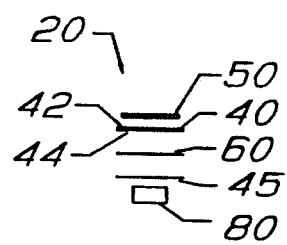
FIG. 9 is an exploded end view of a second embodiment of the load cell means and including a temperature control circuit of the present invention.

The load cell also includes a damping means or visco-elastic polymer 60 that coats at least a portion of one of the surfaces 42, 44 of beam member 40. Visco-elastic polymers suitable for use in the load cell 20 of the present invention are of the SCOTCHDAMP ®family as manufactured by the 3M Company. In the illustrated embodiment, the visco-elastic polymer is bonded to the entire underside of the beam member 40 according to conventional methods. However, it will be noted that coating the entire under surface may not necessarily be required, depending on the sensitivity needed for a particular measurement application. In addition, should further damping be required, the visco-elastic may be sandwiched between beam member 40 and a second substrate 45 or metal constraining layer (such as stainless steel) as shown in FIGS. 7-9 and bonding the substrates together.

The load cell described above is an accurate and reliable measurement tool as long as the temperature of the environment in which it is located remains constant. Those knowledgeable in the use of visco-elastic polymers will certainly be aware of the fact that the energy absorptive properties of visco-elastics vary significantly with even small variations of temperature. Thus, in order for this concept to find the widest application, it is necessary to eliminate the disadvantages associated with the use of visco-elastic polymers under conditions of varying temperature. This is accomplished through the addition of a temperature control means 70 for maintaining the damping means 60 at a predetermined constant temperature and is illustrated in FIGS. 7-10.

The temperature control means 70 functions to measure the actual load cell temperature and to produce an output signal that adjusts the load cell temperature to maintain it at a predetermined constant value.

A temperature sensing means or thermistor 80 is operatively associated with the load cell 20 and produces an output signal $V_T$ in lines 82 that is proportional to the measured load cell temperature. The thermistor is attached to the load cell via conventional means such as an epoxy resin or equivalent means.

A temperature control circuit 85 is provided and is adapted to receive as inputs, a temperature set point signal $V_S$ corresponding to the desired load cell temperature and the thermistor output $V_T$ corresponding to the measured load cell temperature. The temperature control circuit 85 includes means for comparing the difference between the temperature set point $V_S$ and the thermistor output signal $V_T$ and for generating a difference signal $V_D$ proportional thereto $[V_D = G \times (V_S - V_T)$ where G is a gain factor]. The difference signal $V_D$ is then fed back to the bridge circuit. As was previously mentioned, the bridge circuit is a Wheatstone bridge which is a resistive bridge. Thus, when the excitation voltage $V_D$ is increased, the electrical energy or power dissipated in the resistors also increases which acts to adjust (heat) the load cell as well as the visco-elastic polymer. Similarly, when the excitation voltage $V_E$ decreases, the electrical energy dissipated by the bridge decreases, thus, lowering the temperature of load cell 20. It will be noted that integral control may be used with equal efficacy to generate the signal $V_D = G (V_S - V_T)$.

In operation, a curvilinear force to be measured is applied to force displacement link 34. This force is translated into a deforming force in beam 20 which also similarly acts on strain gauge 50. This causes the resistance of each of the strain gauge elements to change. This change in resistance is output through electrical connections 52 to a data processing system for use as desired.

With respect to the temperature stabilization feature, the thermistor 80 constantly monitors the actual load cell temperature. The signal representative thereof $V_T$ is generated and is one of two input signals to temperature control circuit 85. The temperature control circuit 85 also receives a second input signal which is a temperature set point signal $V_S$. These two signals, $V_T$, $V_S$ are compared by temperature control circuit 85 which generates a difference signal $V_D$ which is proportional to the difference between $V_T$ and $V_S$. This difference signal $V_D$ is then fed back to the bridge circuit to increase or decrease the power dissipation thereof to maintain the load cell 20 at the predetermined constant temperature. It will be noted that in the illustrated embodiment, a four arm bridge circuit is employed, however, other arrangements could be employed with equal efficacy. An important feature of the present invention resides in the circuit a described above in that the bridge output signal $V_M$, is ratiometric to bridge excitation voltage, $V_D$, so that to have a signal that is representative of only strain (and not temperature), $V_M$ must be divided by $V_D$, with additional circuitry, such as with an analog or digital multiply/divide unit, not shown, but well known to those skilled in the art.

The foregoing embodiments and examples are to be considered illustrative, rather than restrictive of the invention, and those modifications which come within the meaning and range of equivalence of the claims are to be included therein.

That which is claimed is:

1. A transducer for converting an applied curvilinear force into an electrical output signal and comprising:
    a load cell means for converting an input signal in the form of a curvilinear applied mechanical force into an electrical output signal that is a function of the applied mechanical force; said load cell means comprising:
    an elongate substantially flat substrate having a first surface and a second surface,
    a strain gauge means mounted to one of said surfaces, said strain gauge means including output means for providing an electrical output signal as a function of the force applied to said substrate;
    a damping means coating at least a portion of one of said surfaces; and
    a column means for communicating the applied curvilinear force to said load cell means, said column means having a first end a second end, the first end of said column means adapted to receive said curvilinear force and the second end thereof connected to the load cell means; whereby the applied force acting to deform the substrate is translated into an electrical output signal, substantially free of resonant vibration.

2. The transducer according to claim 1 wherein said strain gauge means produces an electrical output signal that is substantially proportional to the force applied to said substrate.

3. The transducer according to claim 1 wherein said strain gauge means comprises a metal foil strain gauge.

4. The transducer according to claim 1 wherein said strain gauge means comprises a semiconductor strain gauge.

5. The transducer according to claim 1 wherein said strain gauge means comprises a sputtered strain gauge.

6. The transducer according to claim 1 wherein said strain gauge means comprises a bridge circuit.

7. The transducer according to claim 1 wherein said strain gauge means comprises a Wheatstone bridge circuit.

8. The transducer according to claim 1 wherein said damping means comprises a visco-elastic polymer.

9. The transducer according to claim 1 further including a second substrate and wherein the damping means is positioned in sandwich fashion between said substrate and said second substrate and bonding said substrates together.

10. The transducer according t claim 1 further including a temperature control means for maintaining said damping means at a constant temperature.

11. The transducer according to claim 10 wherein said temperature control means further includes:
    a) a temperature sensing means operatively associated with said load cell and adapted to output an output signal proportional to a measured load cell temperature;
    b) a set point temperature input signal corresponding to a preselected damping means set point temperature;
    c) means for comparing the difference between the set point temperature input signal and the measured load cell temperature signal and for generating a difference signal proportional thereto; and
    d) said difference signal being fed back to said temperature control means to vary the power thereof and thereby adjust the damping means temperature in proportion to the magnitude of said difference signal, whereby the temperature of the damping means is maintained at the preselected temperature.

12. A transducer according to claim 1 wherein said column means has a length to diameter ratio of between about 20 to about 80.

13. A transducer for converting an applied curvilinear force into an electrical output signal and comprising:
    an elongate thin substantially flat substrate having a first surface and a second surface, and a proximal end and a distal end, the proximal end of said substrate being mountable to a mounting block;
    a strain gauge means mounted to one of said surfaces, said strain gauge means including an output means for providing an output signal as a function of the force applied to said substrate; and
    a visco-elastic polymer coating at least a portion of one of said surfaces for absorbing resonant vibration; and
    a column means having a first end and a second end, the first end of said column means adapted to receive the applied force and the second end of said column means being connected to the distal end of said substrate.

14. The transducer according to claim 13 further including a temperature control means for maintaining said visco-elastic polymer at a predetermined constant temperature.

15. A transducer according to claim 14 wherein said temperature control means further includes:
    a) a temperature sensing means operatively associated with said substrate and adapted to output an output signal proportional to a measured substrate temperature;
    b) a set point temperature input signal corresponding to a desired visco-elastic set point temperature;
    c) means for comparing the difference between the set point temperature input signal and the measured substrate temperature signal and for generating a difference signal proportional thereto; and
    d) said difference signal being fed back to said strain gauge means to vary the power thereof and to thereby adjust the visco-elastic polymer temperature in proportion to the magnitude of said difference signal, whereby the temperature of the visco-elastic polymer is maintained at the predetermined temperature.

16. A transducer according to claim 15 further including a second substrate and wherein said visco-elastic polymer is positioned in sandwich fashion between said substrate and said second substrate and bonding said substrates together.

* * * * *